May 8, 1923. 1,454,816
J. G. JONES
PHOTOGRAPHIC CARTRIDGE
Filed July 25, 1921
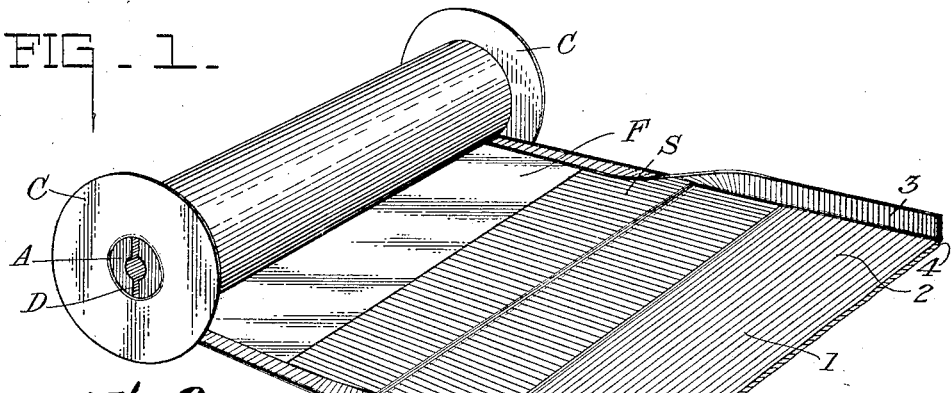
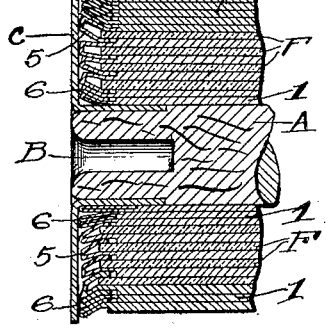
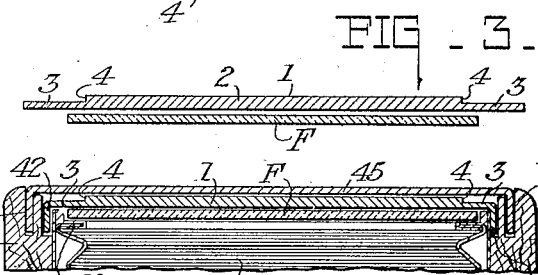
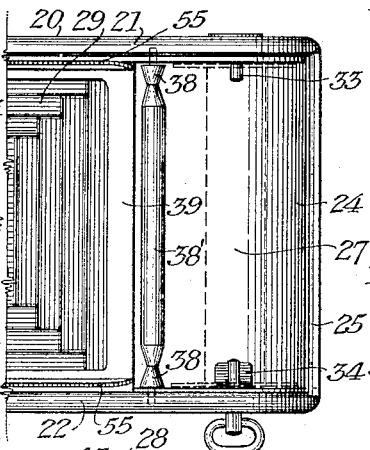
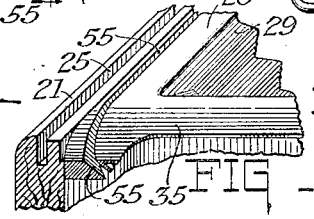
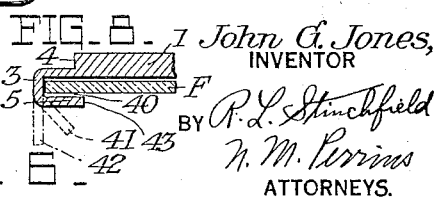
WITNESS
John G. Jones,
INVENTOR
BY
ATTORNEYS.

Patented May 8, 1923.

1,454,816

UNITED STATES PATENT OFFICE.

JOHN G. JONES, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC CARTRIDGE.

Application filed July 25, 1921. Serial No. 487,451.

*To all whom it may concern:*

Be it known that I, JOHN G. JONES, a citizen of the United States of America, residing at Rochester, in the county of Monroe and State of New York, have invented certain new and useful Improvements in Photographic Cartridges, of which the following is a full, clear, and exact specification.

This invention relates to photographic cartridges of the type commonly used in cameras and comprising a roll of film and protective paper therefor.

More particularly this invention has for its object the elimination of the fault commonly known as edge fog which results from the undesired leaking of light into the margin or border of a roll film.

My invention is in certain of its aspects a modification of that disclosed in my copending applications, Serial Nos. 487,447 and 487,448 filed July 25, 1921, in that the improved cartridge herein specifically described and claimed consists of interwound bands of film and protective paper, the paper being wider than the film and having thin margins which, in the form of my invention which includes a spool with end flanges, is also wider than the distance between the flanges.

The objects and advantages of my invention will more fully appear in the following description in which reference is made to the appended drawings. Those parts which are the same in various figures bear the same reference characters in each. It is to be understood that the figures are not drawn to scale, but are so proportioned as best to illustrate the features of my invention.

Fig. 1 is a perspective view of a partially unwound film cartridge, the leader strip being broken away;

Fig. 2 is a section of one end of such a cartridge;

Fig. 3 is a section through the film and the backing paper, the margins of which are here shown flattened out;

Fig. 4 is a fragmentary sectional view, taken on the line 4—4 of Fig. 5, of the back of a camera showing a section of the film and backing paper as they pass through the same.

Fig. 5 is a rear elevation of a camera with the back removed which is adapted for use with the cartridge shown in Fig. 1;

Fig. 6 is a fragmentary view including a section taken on the line 6—6 of Fig. 5;

Fig. 7 is a section of an end view of a film cartridge embodying a modified form of my invention;

Fig. 8 is a fragmentary sectional view of the paper and film illustrating the movement of the margin thereof in the camera.

Upon a film spool of the ordinary character comprising a core A and metallic end flanges C and having at one end an axial pintle opening B, and at the other end the customary slot D are interwound a strip of film F and a piece of backing paper 1, the latter being longer than the film which is attached thereto by the usual sticker S. The backing paper preferably throughout its length has its median portion 2, by which I mean the portion between the margins, of uniform thickness, while its margins or borders 3 are of a less but uniform thickness, there being slight shoulders or abutments 4 at the inner edges of these margins or ledges. The width of the median portion 2 is less than that of the film with which the backing paper is used, and the margins extend out considerably beyond each edge of the film when unfolded, as shown in Fig. 3. When wound upon the spool, however, these margins are bent around the edges of the film, their position when thus wound being shown at 5 in Fig. 2, this illustrating also the condition in which the user obtains the film from the manufacturer. The margins of the lead strip portions are bent back upon themselves as shown at 6.

While a cartridge of this type might be used in a wide variety of roll film cameras, I have particularly shown, as an illustrative example, one specifically adapted for such use. It is to be understood, however, that I do not in any way limit myself to the use of the cartridge with such a camera, nor do I in this application include claims to the camera, the application being limited to the film cartridge.

In Figs. 4, 5 and 6 I have illustrated a camera in which a film cartridge of the kind above described can be used. The camera designated broadly by the numeral 20 consists of sides 21 and 22 and ends 23 and 24, all of these being slotted at 25, so that a cover 45 will fit upon the body with a light tight connection. The bellows 29 is of the usual type and is supported at one end by a bellows frame 28. This frame differs from that of the ordinary camera in that one end 35, which is toward the spool chamber 26, is not provided with the usual roller. A supply spool 30 is mounted in chamber 26 upon centering pins 31 and 32, and the take-up spool is carried by the chamber 27 by means of pin 33 and the winding key 34. In order to unfold the margin 3 of the film backing paper 1 from the edge of the film F, knifelike edges 36 are provided on the rounded plate 35, which forms one end of the bellows chamber. This plate curves upwardly, as is shown in the drawing, until the film is brought to the focal plane of the camera. The edges 36 enter into the slot 40 shown in Fig. 8 which lies between the bent back margin 5 of the backing paper and the film. As the packing paper is wound across the exposure area the folded portion moves into the position shown in dashed lines 41, in Fig. 8, which is that in which it lies when passing the slot 55 at the section shown in Fig. 6. Continuing the unfolding movement, it reaches the position shown in dot and dash lines at 42, Fig. 8, this position being shown also in Fig. 4. In this way the entire area of the film is exposed to the bellows frame, causing the film to lie flat, and the backing paper is prevented from wrinkling as the film is wound across the exposure area. A slight curve in the slot 55 at end 39 of the bellows frame causes a reverse of this unfolding movement and allows the beveled parts 38 of the roller 38' to fold the margin of the backing paper again around the film after the exposures have been made, as is shown in Fig. 8 at 43. When the film is completely wound on the take-up reel, the edges are all protected from light by means of the folded margins of the backing paper.

I have shown in Fig. 7 a modified form of cartridge. In this there is no support such as a core or end flanges, the cartridge consisting only of the interwound film and backing paper 1, these being coiled into a roll together. The end strips of the backing paper 7 and 8 form light seals inside and outside of the roll of film. The margins of the backing paper 3 are the same as shown in Fig. 3. In this case the margins of the innermost coil are bent back flat against the inner surface of that coil indicated at 9; the margin of the next coil is bent around inside of that, as indicated at 10, and so on until the margins of the coils merely overlap the outer edges of the coils within and of the film band interwound between the backing paper, these overlapping margins constituting the light seals for the ends of the roll. These overlapping margins may be made very slightly adherent by the use of a thin adhesive solution, but this is not absolutely necessary. Such a cartridge may be of use in a variety of cameras, particularly those of a type analogous to that illustrated in Fig. 5, which, with some modification, is readily adapted to its use. Since, however, I am not claiming such a camera in this application, I do not deem it necessary to discuss its use more fully.

It is obvious that numerous modifications embodying the principles above described are possible, and I contemplate all of these as comprised within the scope of my invention as defined in the appended claims.

It is to be further understood that while the different modified forms that I have described and suggested and others which are their equivalents come within the scope of my invention as claimed, these different forms naturally vary in their practicability and in their peculiar advantages and disadvantages. It is evident that the form specifically claimed embodies certain characteristics applicable to cartridges differing considerably therefrom and I contemplate such variations and modifications as within the scope of my invention as claimed.

Having thus described my invention, what I claim as new and desire to secure by Letters Patent is:

1. An article of manufacture and sale, comprising sensitized material and protective material interwound in a spiral coil, the protective material being wider than the sensitized material and the margins of said protective material being thinner than the median portion thereof and bent to form flanges, the film material lying between said flanges.

2. As an article of manufacture and sale, a photographic cartridge comprising sensitized material and protective material interwound in a spiral coil, the protective material being wider than the sensitized material and the margins of said protective material being thinner than the median portion thereof and bent around the edges of the sensitized material.

3. A photographic cartridge comprising a spool with a core and imperforate spaced end flanges rigid therewith, a continuous band of photographic film and a continuous band of opaque material interwound on said spool, said opaque band being wider than the film band and having at its edges continuous, opaque, imperforate flanges, the film band lying between said flanges.

4. A photographic cartridge comprising a spool with a core and fixed imperforate spaced end flanges, a continuous band of sensitized material and a continuous band of opaque material interwound on said spool, said opaque band being wider than the distance between the flanges and also wider than the film, the margins of the opaque band being bent around the edges of the film band.

5. A photographic cartridge comprising a spool with spaced end flanges, photographic film and protective paper interwound on said spool, the paper being wider than the film and also wider than the distance between the flanges, the margins of said paper being thinner than the median portion thereof and bent around the edges of the film.

Signed at Rochester, New York, this 21st day of July 1921.

JOHN G. JONES.